US008418124B2

(12) United States Patent
Turner et al.

(10) Patent No.: US 8,418,124 B2
(45) Date of Patent: Apr. 9, 2013

(54) METHOD AND APPARATUS FOR SOFTWARE POLICY MANAGEMENT

(75) Inventors: Cameron Turner, Ottawa (CA); Hany Bishay, Nepean (CA)

(73) Assignee: Her Majesty the Queen, In Right of Canada As Represented By The Minister of Health Through The Public Health Agency of Canada, Winnipeg (CA)

( * ) Notice: Subject to any disclaimer, the term of this patent is extended or adjusted under 35 U.S.C. 154(b) by 0 days.

(21) Appl. No.: 12/446,125

(22) PCT Filed: Oct. 22, 2007

(86) PCT No.: PCT/CA2007/001860
§ 371 (c)(1),
(2), (4) Date: Apr. 17, 2009

(87) PCT Pub. No.: WO2008/046227
PCT Pub. Date: Apr. 24, 2008

(65) Prior Publication Data
US 2010/0218167 A1    Aug. 26, 2010

Related U.S. Application Data

(60) Provisional application No. 60/862,301, filed on Oct. 20, 2006.

(51) Int. Cl.
*G06F 9/44* (2006.01)
(52) U.S. Cl.
USPC ............................ 717/101; 717/120; 717/121
(58) Field of Classification Search .................. 717/101, 717/120
See application file for complete search history.

(56) References Cited

U.S. PATENT DOCUMENTS

| 6,298,410 B1 | 10/2001 | Jayakumar et al. |
| 6,718,535 B1 * | 4/2004 | Underwood .................. 717/101 |
| 6,941,471 B2 | 9/2005 | Lin |
| 7,096,258 B2 * | 8/2006 | Hunt et al. .................... 717/101 |

(Continued)

FOREIGN PATENT DOCUMENTS

| EP | 1118925 A1 | 7/2001 |
| WO | 2006108436 A1 | 10/2006 |
| WO | 2008046218 A1 | 4/2008 |

OTHER PUBLICATIONS

David Waiting, Open Source Development Tools for IMS Research, 2008, ACM, 10 pages, <URL: http://delivery.acm.org/10.1145/1400000/1390627/a41-waiting.pdf>.*

(Continued)

*Primary Examiner* — Matt Kim
*Assistant Examiner* — Hua Lu
(74) *Attorney, Agent, or Firm* — Curtis B. Behmann; Borden Ladner Gervais LLP (57) ABSTRACT

A system and method for software policy management are provided. A compiled policy-enabled software application includes a policy enforcement point to export an information element to a policy manager. The policy manager includes a policy interpreter having a policy decision point to perform policy decision making based on the received information element from the policy enforcement point. Through a plurality of policy decision points, the policy manager can execute a wide range of policies for different compiled software applications. Policies can be modified centrally in the policy interpreter and changes can affect either one or more of the policy-enabled software applications. A policy manager browser can create and manage the policy decision making performed by the policy interpreter.

18 Claims, 6 Drawing Sheets

U.S. PATENT DOCUMENTS

| | | | |
|---|---|---|---|
| 7,159,125 B2 | 1/2007 | Beadles et al. | |
| 7,254,628 B2 | 8/2007 | Koops et al. | |
| 7,627,658 B2 | 12/2009 | Levett et al. | |
| 2003/0154404 A1 | 8/2003 | Beadles et al. | |
| 2003/0229522 A1 | 12/2003 | Thompson et al. | |
| 2004/0193912 A1 | 9/2004 | Li et al. | |
| 2004/0225727 A1 | 11/2004 | Koops et al. | |
| 2006/0037000 A1* | 2/2006 | Speeter et al. | 717/120 |
| 2006/0041666 A1 | 2/2006 | Karremans | |
| 2006/0149735 A1* | 7/2006 | DeBie et al. | 717/121 |
| 2006/0161895 A1* | 7/2006 | Speeter et al. | 717/121 |
| 2007/0038610 A1 | 2/2007 | Omoigui | |
| 2007/0156897 A1* | 7/2007 | Lim | 717/120 |
| 2008/0066148 A1* | 3/2008 | Lim | 717/101 |
| 2008/0162498 A1 | 7/2008 | Omoigui | |

OTHER PUBLICATIONS

Patrick McDaniel, Methods and Limitations of Security Policy Reconciliation, 2006, ACM, 33 pages, <URL: http://delivery.acm.org/10.1145/1180000/1178620/p259-mcdaniel.pdf>.*

Alex Liu, XEngine: A Fast and Scalable XACML Policy Evaluation Engine, 2008, ACM, 12 pages, <URL: http://delivery.acm.org/10.1145/1380000/1375488/p265-liu.pdf>.*

Dan Lin, Policy Decomposition for Collaborative Access Control, 2009, ACM, 10 pages, <URL: http://delivery.acm.org/10.1145/1380000/1377853/p103-lin.pdf>.*

Jean-Christophe martin, Policy-Based Networks, 1999, Google Scholar, 19 pages, <URL: http://fineit.net/doc/blueprints/1099/policy.pdf>.*

Dirk Kuhlmann, An Open Trusted Computing Architecture—Secure Virtual Machines Enabling User-Defined Policy Enforcement, 2006, Google Scholar, 16 pages, <URL: http://maswi.polito.it/doc/public/rz3655.pdf>.*

International Patent Application No. PCT/CA2007/001860, International Search Report dated Feb. 11, 2008.

European Patent Application No. 07816011.6, European Search Report dated Mar. 8, 2012.

\* cited by examiner

METHOD AND APPARATUS FOR SOFTWARE POLICY MANAGEMENT

CROSS REFERENCE TO RELATED APPLICATIONS

This application claims the benefit of priority of U.S. Provisional Patent Application No. 60/862,301 filed Oct. 20, 2006, which is incorporated herein by reference.

FIELD OF THE INVENTION

The present invention relates generally to computer software architecture and development. More particularly, the present invention relates to policy management for software applications.

BACKGROUND OF THE INVENTION

Computer software is used in many fields of endeavor, including public health. Typically, when a requirement for a particular software application comes to existence, this requirement is brought to a software development team and a project is undertaken. Software development is typically expensive both in terms of cost and time, since each scenario requires the development of many components specific to the particular requirements.

Software functionality requirements typically include security requirements, or access policies. In the area of public health, such policies typically relate to the ability of different users to access different types of health data. For security reasons, these policies are typically specific to the application or database to which they relate, and different policies are associated with, or assigned to, different categories of users.

The separate management of access policies in each application or database can lead to complicated access structures, and can duplicate software development efforts. Policies, and other functions, can be provided external to an application's software code using a programming approach known as function calls, where the functions being called are provided in separate software code.

Standard programming function calls have preset (compiled) behaviour that are to do something specific for the callers of that function call (e.g., sort a list of users, retrieve a list of addresses). The procedure to provide the behaviour within the function call is hard-coded and compiled. The procedure within the function call cannot be updated without recompiling the program. There is a notion of stubs/skeletons in distributed programming. However, at some point, the method or procedure is hard-coded and compiled and provides the same behaviour as standard programming functions.

Applications can be deployed to be used within different jurisdictions that have different constraints. For example, an application deployed in Nova Scotia may require that postal codes must be entered differently depending on where the person lives. It is not desirable to build and deploy different versions of the software or hardcode these differences in the code if it is subject to change.

Known approaches, such as in PCT application WO 2006/108436 and US Patent Application Publication 2006/0041666, provide policy-based management for a specific type of application having certain fixed and defined policy requirements. Such policy management is restricted to managing the same program compiled with the same policy types and the same policies in different instances.

Multiple applications, using the same software, may have different requirements. For example, an internal application will have different password standards than an external application, yet they can use the exact same code. It is not desirable to hardcode these differences in the code.

It is, therefore, desirable to provide an improved and integrated approach to policy management for software applications.

SUMMARY OF THE INVENTION

It is an object of the present invention to obviate or mitigate at least one disadvantage of previous software policy management approaches.

In a first aspect, the present invention provides a method of software policy management. The method includes the following steps: defining policies for first and second policy-enabled software applications; creating a first policy enforcement point in uncompiled software code for the first policy-enabled software application, the first policy enforcement point providing a first information element as an output from a compiled version of the first policy-enabled software application; creating a second policy enforcement point in uncompiled software code for a second policy-enabled software application, the second policy enforcement point providing a second information element as an output from a compiled version of the second policy-enabled software application; creating, based on the defined policies, first and second policy decision points as database fields in a policy manager external to the first and second policy-enabled software applications; receiving the first and second information elements at the first and second policy decision points; and performing policy decision making in response to the received first and second information elements.

The method can further include receiving a policy decision at the first policy enforcement point and determining an action to be taken in the first policy-enabled software application in response to the received policy decision. The method can further include generating and propagating a corporate policy decision by returning the corporate policy decision to the first and second compiled policy-enabled software applications. When the compiled version of the first policy-enabled software application is deployed in a plurality of instances, the method can further include generating and propagating an individual application policy decision by returning the individual application policy decision to each of the plurality of instances of the first policy-enabled software application.

The steps of creating the first and second policy enforcement points can be performed before the step of defining the policies. The policies can be defined in relation to the data in the first information element and/or the second information element. The steps of creating the first and second policy enforcement points can be performed independent of the defined policies.

In another aspect, the present invention provides a computer-readable medium storing statements and instructions for execution by a processor to perform the method of software policy management as described above.

In a further aspect, the present invention provides a system for software policy management including first and second compiled policy-enabled software applications, a policy interpreter. The first compiled policy-enabled software application includes a first policy enforcement point to export a first information element. The second compiled policy-enabled software application includes a second policy enforcement point to export a second information element. The policy interpreter includes first and second policy decision points to receive the first and second information elements, respectively, and to perform policy decision making based on the received first and second information elements.

The system can include a policy manager editor to create and manage the policy decision making performed by the policy interpreter. The first compiled policy-enabled software application can determine an action to be taken in response to receiving a policy decision from the policy interpreter. The policy interpreter can generate a corporate policy decision and propagate the corporate policy decision by returning the corporate policy decision to the first and second policy execution points in the first and second compiled policy-enabled software applications, respectively. When the first compiled policy-enabled software application is deployed in a plurality of instances, the policy interpreter can generate the individual application policy decision and propagate the individual application policy decision by returning the individual application policy decision to each of the plurality of instances of the first policy-enabled software application.

The first policy enforcement point can be included in a method in a class in the first compiled policy-enabled software application. The first policy enforcement point can be included in a method in a class in the first compiled policy-enabled software application. The class can include policy enforcement import statements. The first or second information elements can include: keyword-value pairs on which the policy interpreter will make decisions; a list of policy rule sets to be performed for a given policy; or a policy indicator to indicate a policy rule execution status.

In a yet further aspect, the present invention provides a method of software policy management. The method includes the following steps: defining policies for first and second policy-enabled software applications; creating a first policy enforcement point in uncompiled software code for the first policy-enabled software application, the first policy enforcement point providing a first information element as an output from a compiled version of the first policy-enabled software application; creating a second policy enforcement point in uncompiled software code for a second policy-enabled software application, the second policy enforcement point providing a second information element as an output from a compiled version of the second policy-enabled software application; and creating, based on the defined policies, first and second policy decision points as database fields in a policy manager external to the first and second policy-enabled software applications, the first and second policy decision points to receive the first and second information elements and perform policy decision making in response to the received first and second information elements.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a system and method for software policy management. A compiled policy-enabled software application includes a policy enforcement point to export an information element to a policy manager. The policy manager includes a policy interpreter having a policy decision point to perform policy decision making based on the received information element from the policy enforcement point. Through a plurality of policy decision points, the policy manager can execute a wide range of policies for different compiled software applications. Policies can be modified centrally in the policy interpreter and changes can affect either one or more of the policy-enabled software applications. A policy manager browser can create and manage the policy decision making performed by the policy interpreter.

A policy manager according to an embodiment of the present invention is a data-driven, rules-based expert system capable of monitoring data stored in database and memory data stores and making intelligent decisions based on that data. Since databases house large amounts of data in distributed tables, valuable information can reside undetected among these tables. Information such as a user logging in at an abnormal time or the frequency of a person visiting different clinics within a 24-hour period could be critical knowledge to some database users. Therefore, monitoring and extracting information from a database is of great importance.

One of the primary reasons for policy manager's existence is to remove policy rules from code to an application. Many policies are similar in nature—monitor the database for some event to occur and then perform an action (usually a database action in conjunction with an email message).

The alternative to the policy manager would be to continue developing new software each time a new policy is required. This alternative is rejected due to the time it takes to create a new piece of software to address a single policy. Using the policy manager, policies can be created on the fly in a matter of minutes without any software recompilation or deployment.

Embodiments of the present invention can advantageously be implemented in conjunction with a configurable browser-based form application, such as described in the co-pending and commonly assigned International Patent Application No. PCT/CA2007/001845 filed on Oct. 22, 2007 and entitled "Method And Apparatus For Creating A Configurable Browser-Based Forms Application", which is incorporated herein by reference. The policy manager according to an embodiment of the present invention can be provided as a policy manager service, which can be part of an application shell, to produce a browser-based project. A configurable browser-based form application can be described as a policy-enabled application.

A configurable browser-based application is very data-centric. A data element is the granular element of what is entered, stored and retrieved. These data elements correspond to a field which contains a value. The field can be a field within a database table. Alternatively, the field can be a field within a browser-based form as part of a browser-based application.

Therefore, at their core, configurable browser-based form applications primarily deal with fields and their values, whether these fields are stored as database fields or in memory as browser-based fields. These fields can store anything and be of any type. They can represent the name of a person (e.g., a text box), the date a contractor started work (e.g., a date field), the list of symptoms a person has (e.g., a multi-selection drop-down list) or a set of tests, dates and outcomes (e.g., a complex grid containing multiple values).

Given how important fields and their values (data elements) are, a policy can be defined as a modifiable and user-defined action, constraint or transformation on a data element. A policy is modifiable and user-defined because users change their minds. It is not efficient to constantly recompile and redeploy a program because a user wants to change the format of a date field, then change it again, then change it back. A policy is generally a function that the policy manager tool performs on an application based on a user requirement, and is not the user requirement itself.

Policy Enablement and Enforcement

A policy-enabled application is an application that defers policy decision making to an external entity. This external entity is called a policy decision point (PDP). In embodiments of the present invention, the PDP is the policy manager (more specifically, the policy interpreter). Whenever a policy decision has to be made within a policy-enabled application, or it is foreseeable that certain data may be useful for such purposes, a policy enforcement point (PEP) is created.

Figure 1:
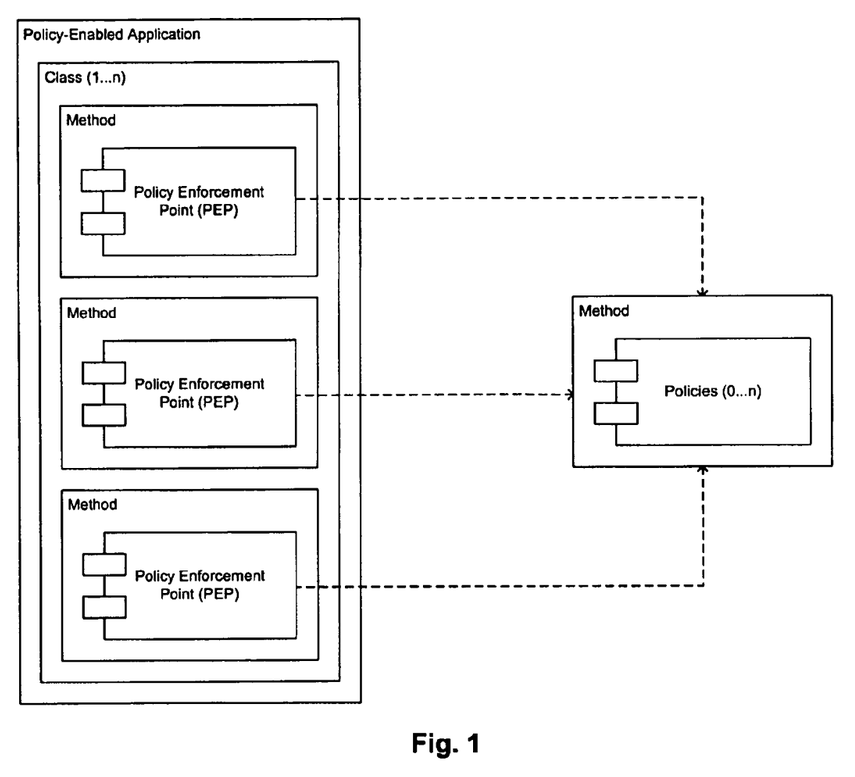
FIG. 1 illustrates a policy enforcement architecture according to an embodiment of the present invention.

FIG. 1 illustrates a policy enforcement architecture according to an embodiment of the present invention. As can be seen, a policy-enabled application can comprise n classes with each composed of several methods. Within a method, there can be a PEP that defers its policy decisions to the PDP. At this PDP, there can be [0 . . . n] policies executed. Therefore, sometimes there may be no policies executed (e.g., application deployed to a different jurisdiction) or there may be 1000 policies executed. That is where the flexibility of policy decision making enters the picture. However, it must be noted that PEPs are only required when policy decision making is required. Policy decision making is not required in every method or even every class.

In some cases, a policy decision point does not need to return a policy decision to the policy-enabled application, such as if the policy decision point simply updates a table. In other cases, the policy decision point outputs a policy decision that is returned to the policy-enabled application. For example, suppose the policy decision point updates a table and sets a value under certain conditions. The application may take a different course of action depending on whether the value that is set, and what the value is. For example, if a mandatory field is set to be on, the application will change the display colour for that field; if the mandatory field is set to be off, the application will not change the display colour for that field. As such, the application can receive a policy decision from a policy interpreter and determine an action to be taken in response to the received policy decision.

Policies can be corporate policies, affecting all applications in an organization, or can be application-specific policies. For example, an organization can set a corporate password policy that affects all applications. If the corporate policy is changed at the policy interpreter, that change is propagated to all affected applications without having to make a change in the application itself. This is part of the power of centrally controlling the policy management in a way that does not require recompiling of individual applications, or even editing individual applications, since all policy management is "outsourced" to the policy manager.

Policies can also be individual application policies. For example, suppose it is desired to change a date format in a first application, but not in a second application. Also, suppose that the first application has multiple instances deployed at a multitude of locations, for example in public health applications. A user can make a change to an individual application date format policy that will then be propagated to all instances of the first application, without affecting the second application.

In another embodiment, a policy change can affect more than one application, but not all of the applications. This can be achieved if the policy enforcement point used for the policy in question is the same in each of the applications.

In order to integrate policy management into an application, import statements can be added at the top of the class that requires policy enforcement. Examples of such import statements are:

```
import ca.gc.hc_sc.DLDataServiceP.RuleEngineP.RuleBeanC;
import ca.gc.hc_sc.DLDataServiceP.RuleEngineP.RuleEngineC;
import ca.gc.hc_sc.DLDataServiceP.RuleEngineP.RulePropertiesC;
import ca.gc.hc_sc.DLDataServiceP.RuleEngineP.RuleViolationC;
import ca.gc.hc_sc.DLDataServiceP.RuleEngineP.RuleWarningC;
```

Depending on the type of policy enforcement that is required, some of these classes may not be required. For instance, if using a class that implements the RuleBeanI or ModifiableRuleBeanI interface, then the RulePropertiesC class will not have to be implemented as it will be included in the other class.

Five information elements will now be described that a policy Enforcement Point within a policy-enabled application can provide to the policy Decision Point. These are as follows.

RuleBeanC: this object holds the facts on which policies will make decisions. These facts are represented as keyword-value pairs and are contained within a RulePropertiesC object. Usually, a PEP adds all the information that is known at that point to the RuleBeanC object in order for the greatest flexibility in policy decision making. If these facts involve data elements that are seen on the user interface of an application, they should be represented exactly as they are shown (e.g., Date of Birth instead of dateOfBirth). To set up a RuleBeanC object, code such as the following can be used:

```
// Set up the facts.
//
RulePropertiesC myFacts = new RulePropertiesC( );
myFacts.setProperty("City", "Ottawa");
myFacts.setProperty("Date of Birth", "08/08/1960");
// Create the RuleBeanC object.
//
RuleBeanC myBean = new RuleBeanC(myFacts);
```

Policy Rule Set: this ArrayList or String constrains the list of policy rule sets to use so that the entire policy set stored in the repository are not tested. The data type to use depends on the policy manager method used. As an example, if an application seeks to execute policies when a Subject is saved, there may be a policy rule set created called "Subject Validation" and this is the only policy rule set that should be run. Therefore:

```
ArrayList ruleset = new ArrayList( );
ruleset.add("Subject Validation");
    or
final String ruleset = "Subject Creation|Subject Editing";
```

Policy Failure Point: this String is only used for a method that executes rules with policy indicators, and is represented by a constant value, such as Policy Failure. This String specifies the fact that the policy manager must look for to see if a failure occurred. For instance, when saving a Subject, the information should be validated through the policies (e.g., data integrity policies). Therefore, a fact can be specified in the policies to indicate a policy violation. This would be the policy Failure Point. A policy could be:

```
IF !Exists(Subject Name)
FROM session
THEN SetSession(ALPHA policy Failure, Subject Name must be specified)
```

Therefore, if this policy fired, a fact, policy Failure, would exist containing the message "Subject Name must be specified".

Policy Warning Point: this String is only used for a method that executes rules with policy indicators, and is represented by a constant value, such as Policy Failure. This String specifies the fact that the policy manager has to look for to see if a warning occurred. For instance, when saving a Subject, the information should be validated through the policies (e.g., data integrity policies). Therefore, a fact can be specified in the policies to indicate a policy warning. This would be the policy Warning Point.

A policy could be:

```
IF <Association Rules Condition>
FROM session
THEN SetSession(ALPHA policy Warning, Association Rules warning occurred);
```

Policy Information Point: this String is only used for a method that executes rules with policy indicators, and is represented by a constant value, such as Policy Failure. This String specifies the fact that the policy manager has to look for to see if an information message occurred. For instance, when saving a Subject, an email may be sent to another user to indicate that the Subject has been created. Therefore, a fact can be specified in the policies to indicate a policy information message, which in this case, would be to indicate that an email was sent. This would be the policy Warning Point.

A policy could be:

```
IF <...>
FROM session
THEN SetSession(ALPHA policy Information, An email has been sent to user {User}.);
```

An information message, a warning, a failure or any similar indication can all generically be referred to as a policy rule execution status.

As previously stated, it is up to the developer to determine the best policy manager method to invoke. The decision is based on whether or not the developer wants to know about a failure, warning and failure or the result is either contained within the policy (e.g., database policy rules) or the developer wants to analyze the policy decisions themselves. The methods include, for example, execution of rules with or without policy indicators.

Once all the policies have been tested and the appropriate policies have been fired, analysis of the policy decisions can occur. The type of analysis is up to the developer and depends on the expected results. If the policies are database rules that will check database information and modify the database based on the policy decisions, no extra policy decision analysis would be required at the PEP. If, however, a failure or warning may occur then this case must be watched. Also, if the developer would like to do their own policy decision analysis, then this must be handled as well.

Policy rules are stored in the Rules table in the database instance of your application. According to an embodiment of the present invention, to use the policy rules, tables such as the following two tables are provided:

```
CREATE TABLE RULES
    (
        ID                  NUMBER,
        RULEPRIORITY        VARCHAR2(20),
        EXECUTION_ORDER     VARCHAR2(20),
        RULESTATUS          VARCHAR2(20),
        RULETYPE            VARCHAR2(40),
        RUNEVERY            VARCHAR2(15),
        TITLE               VARCHAR2(80),
        CONDITION           VARCHAR2(3000),
        SOURCE              VARCHAR2(500),
        ACTION              VARCHAR2(3000),
        PRIMARY KEY (ID),
        UNIQUE (TITLE)
    );
```

TABLE 1

```
CREATE TABLE WORKING_MEMORY
    (
        FACT     VARCHAR2(100),
        SVALUE   VARCHAR2(3000),
        IVALUE   NUMBER
    );
```

TABLE 2

In other embodiments of the policy manager (both web and Visual C++ versions), the following table, sequences and default data are also provided:
-- Table
--
CREATE TABLE RB_RULETYPES
    (
        RULETYPE    VARCHAR2(40),
        UNIQUE (RULETYPE)
    );
-- Sequences
--
CREATE SEQUENCE rb_ruletypes_id_seq START WITH 1 increment by 1;
CREATE SEQUENCE rb_rule_id_seq START WITH 100000 increment by 1;

TABLE 2-continued

```
-- Default Data
--
INSERT INTO RB_RULETYPES VALUES ('Unassigned');
In the policy manager (Visual C++ version) embodiment, the
following table and default data is also provided:
    -- Table
    --
    CREATE TABLE RULEWATERMARK
    (
        ID          NUMBER,
        PRIMARY KEY (ID)
    );
    -- Default Data
    --
    INSERT INTO RULEWATERMARK VALUES (100000);
```

Policy Manager

A policy manager according to an embodiment of the present invention comprises two main tools. A policy manager browser/editor is a stand-alone, Windows-based desktop application that is used to create and manage the rules that will monitor the system. The other tool, policy interpreter, is a platform-independent application that is used to do the actual data monitoring—making decisions about which rules to fire and when. The policy interpreter can operate in either as a stand-alone product or integrated with another Java application.

With a policy manager according to an embodiment of the present invention, knowledge and control are separated to allow for on-the-fly, dynamic rule creation and modification with no code recompilation. Consequently, work moves from the code to the application.

In contrast to standard programming functions, a policy manager according to an embodiment of the present invention aims to provide dynamic behaviour, not in a procedural way but rather, a logical data-driven way. In some instances, the output of the policy decisions made by the policy manager guide the course of action a program takes after the call to the policy manager. However, this is not necessary. Once in the policy manager, there can be 0 policies executed, 1 policy executed or n policies executed. In addition, depending on the data elements (fields and their values) at a point in time, different policies or a different number of policies will be executed. It is all dynamic and can be changed without recompiling the application program that is using the policy manager.

Also, the behaviour of a policy manager according to an embodiment of the present invention may be completely different than known approaches. As opposed to the case in standard programming where a function is called to sort a list of names (and the output is a list of sorted names), with the policy manager according to an embodiment of the present invention, the behaviour can differ from application to application.

An agent, integrated with the policy manager, can wake up periodically, e.g. every hour, and take some sort of action. What the policy does is determined by the policy configuration. In one case, the policy can look for a user who has not updated their password by checking a field in the database and sending out an email to an administrator. In a second case, the policy can purge all files greater than 1 MB to stop the disk space from running out. It a third case, the policy can purge all files greater than 1 MB that have not been updated in the last week. In a fourth case, the policy does nothing. In another case, the agent can start off doing nothing and then after a week, a policy is created to purge all files greater than 1 MB. The agent which, in this case is the application using the policy manager, is not recompiled.

The action, constraint or transformation on a data element is typically what is performed using the policy manager. Constraints are place on data (e.g., the name must exist, a date must be in a certain format), data is transformed (e.g., concatenate strings, update values based on new information) and finally, actions are performed on data elements (e.g., delete values or records, copy files, perform regular expressions on values etc.).

Given this definition of a policy and the desired functionality of applications, a policy manager according to an embodiment of the present invention is therefore designed to provide a pluggable, independent class framework to enforce a modifiable and user-defined action, constraint or transformation on a data element that can occur at any point within an application.

The policy manager is a pluggable, independent class framework in order to be inserted with minimal effort (pluggable) by a developer in an application at any point within that application where there could be potentially dynamic behaviour required. Stated another way, the policy manager is an independent software program such that the work involved to instrument it into an application is relatively easy.

This "plugging" can occur at any point within an application. In conjunction with the fact that the field can store anything and be of any type, this is important in understanding why the policy manager is designed to be generic. It can be used anywhere within an application. It is not desirable to have the policy manager hard-coded to fulfill only one policy situation as there are too many different policy situations within an application.

For example, email filtering rules can be considered to be policies for an email application. The user is given control over these policies. The policies are provided in a generic framework, with the user providing configuration parameters to configure the policies in the framework into desired user policies.

However, using the email filter as an example, the policy manager is not designed to handle email filters only. A policy manager according to an embodiment of the present invention can handle different policy situations such as: validating data constraints of data elements within a web-based form; checking a value in a database field, and alerting a user to that value if it violates a rule; and checking whether or not a server is up and running every hour. Each of these policy situations are relatively diverse, yet they can all be reduced down to data elements. This is what distinguishes a policy manager according to an embodiment of the present invention from known policy management approaches.

The policy manager can be described as providing a pluggable, independent class framework to enforce a policy (as defined above) at any point within an application. The application includes policy execution points, which will be described later. The policy manager provides a means to provide actions or analysis of data elements that are interpreted at run-time based on a hierarchy of user-defined rules that guide actions, constraints or transformations resolution strategy. It provides optional inputs into the framework to assist in policy decision making as well as provides optional outputs from the framework to assist in controlling the behaviour of an application based on these policy decisions. It also provides a means for developers to extend the framework to add new types of conditions and new types of actions to further satisfy additional or unforeseen user requirements.

Figure 2:
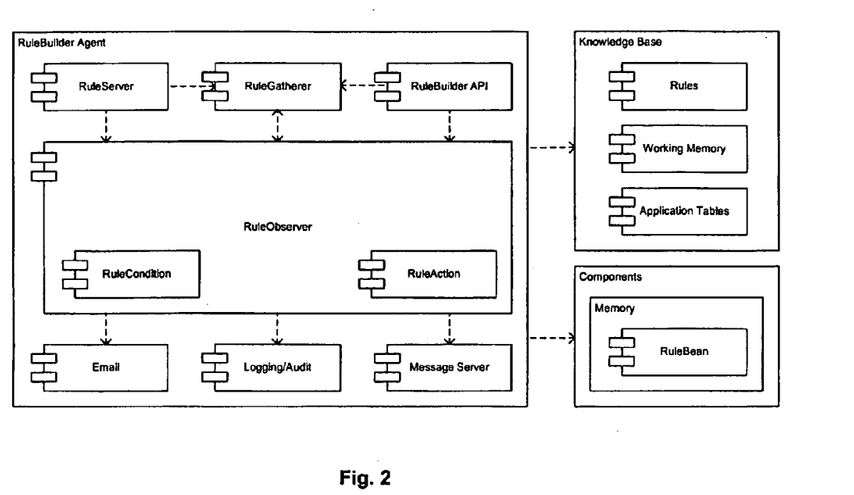
FIG. 2 illustrates a policy enforcement architecture according to an embodiment of the present invention.

FIG. 2 illustrates a policy manager logical architecture according to an embodiment of the present invention. The policy manager Interpreter is divided into three main components. First of all, the RuleGatherer component is responsible for collecting the rules at a preset time. The RuleObserver component is responsible for analyzing the rules and firing those rules whose conditions have passed. Finally, the RuleServer component is responsible for setting up the RuleGatherer and RuleObserver.

The RuleObserver can be further broken down into its Condition and Action components.

Smaller components such as Email, Logging and Audit are used by the Action components to carry out functionality the rule developer wants to see done (e.g., send an email to the Superuser notifying them of some event).

Hooking into these components is the policy manager API. This component allows other applications to build the policy Interpreter functionality into their process space and control when policy manager is run. It also allows the policy manager to execute rules using data stored in memory.

The policy Interpreter can interact with three other data store entities: the Knowledge Base (Oracle) which is the primary data source, the File System and the application's session object in memory.

Figure 3:
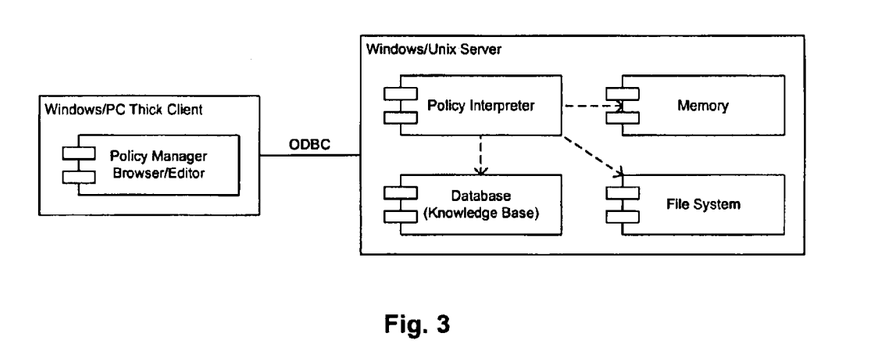
FIG. 3 illustrates a policy manager physical architecture according to an embodiment of the present invention.

FIG. 3 illustrates a policy manager physical architecture according to an embodiment of the present invention. The policy manager browser/editor (to browse and manage policy rules) resides on a Windows-based PC (e.g., Windows 95, 98, 2000, NT etc.) and communicates with the knowledge base (Oracle Database) using an ODBC connection. The policy interpreter, knowledge base, file system and memory for interpreting and firing the policy rules also exist on the server (NT/2000/HP-UX/Solaris). These operating systems and platforms are provided as illustrations, and others can alternatively be used.

Figure 4:
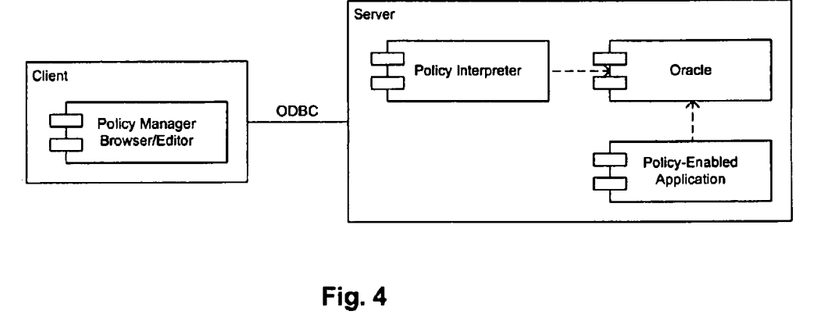
FIG. 4 illustrates a policy manager process architecture according to an embodiment of the present invention.

FIG. 4 illustrates a policy manager process architecture according to an embodiment of the present invention. This figure illustrates the different processes that are running on each type of machine.

On the client side, only one policy manager editor/browser process will be running. This client is usually a technical staff member's Windows-based PC (e.g., Windows 2000).

The policy Interpreter has its own process space on the server-side and will be automatically started when an agent that uses the policy Interpreter is started.

If the policy manager is built into an application (i.e., policy-enabled application), policy interpretation runs as part of that application's process space.

Rules are tested and fired on a pre-determined run cycle. This run cycle is configurable when the policy Interpreter is started as an independent application. This time can be once a day, once an hour or once a minute. When the policy Interpreter is built into another application, policies are invoked on demand.

When an Oracle instance (i.e., SID) is started on the server, multiple Oracle processes are also spawned. Primarily, a server process for each connection is started. There are usually around 3 connections created for an application to handle several concurrent users. Several background processes are also started. These processes include a database writer, log writer, system monitor, process monitor and a checkpoint process. The functions of these processes are outside the scope of this document although they ensure the integrity of the database instance when multiple users are involved.

Figure 5:
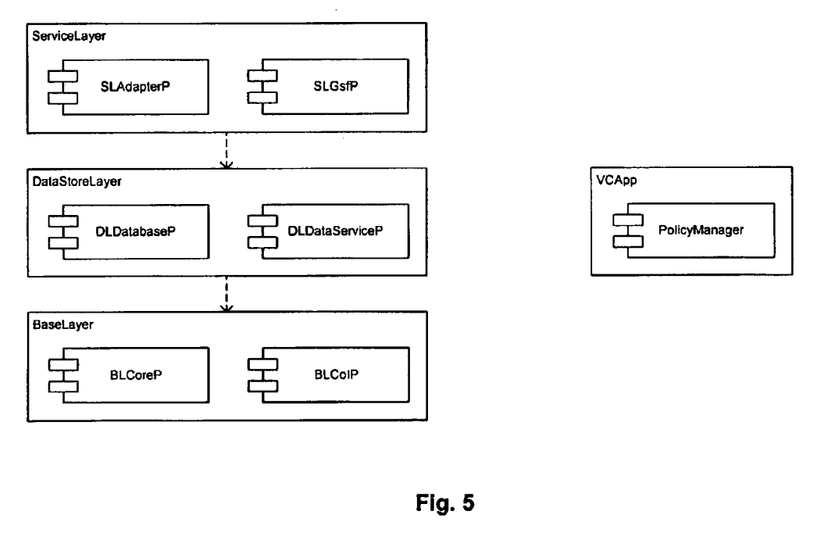
FIG. 5 illustrates a component architecture for a policy manager engine according to an embodiment of the present invention.

FIG. 5 illustrates a component architecture for a policy manager engine according to an embodiment of the present invention. In FIG. 5, the policy Interpreter resides in the DLDataServiceP repository. However, other repositories such as DLDatabaseP, to provide database access, and core libraries, BLCoreP and BLCoIP, are required for the policy Interpreter to carry out its functions. The ServiceLayer is included to indicate that the policy Interpreter can be called from other applications and services.

The policy manager browser/editor is in its separate repository in VCApp, which has no dependencies on the other layers as it is C++ based.

Figure 6:
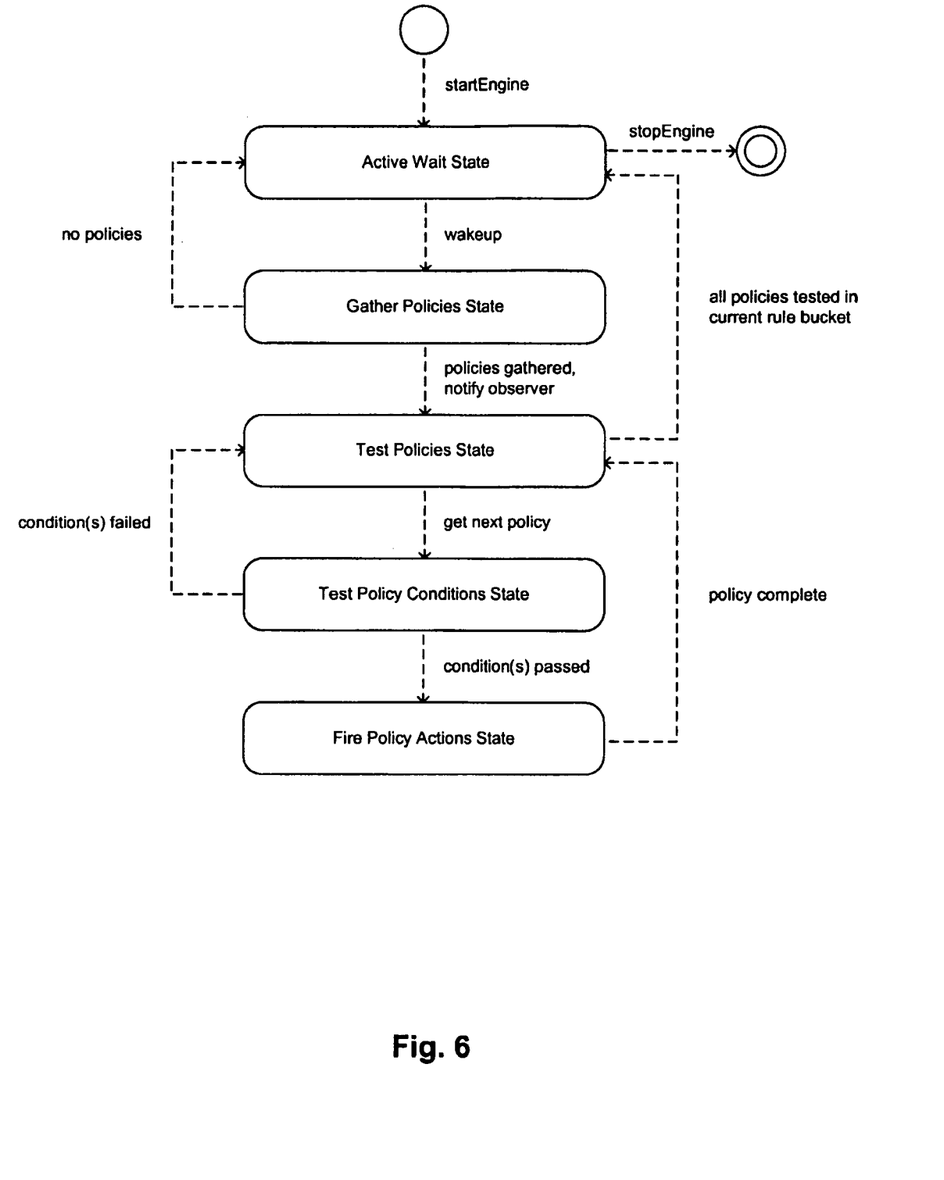
FIG. 6 illustrates a policy interpreter state diagram according to an embodiment of the present invention.

FIG. 6 illustrates a policy interpreter state diagram according to an embodiment of the present invention, indicating the various states the policy Interpreter can be in. Once the policy interpreter has been started with a startEngine command, the policy Interpreter goes into an active wait state. Once activated at a given time interval (e.g. every 5 minutes), the policy Interpreter will wakeup and go into the gather policies state. If there are policies to be tested, the observers will be notified. Otherwise, the policy Interpreter goes back into the wait state.

Once the observers have been notified, the policy Interpreter enters the Test Policies State. The next policy is retrieved and its conditions are tested. If the conditions for the policy are satisfied, the actions are fired. The cycle of getting the next policy, testing its conditions and firing its actions, if applicable, is repeated until there are no further policies to be tested for that rule bucket. At this point, the policy Interpreter returns to the wait state and the cycle continues until the policy Interpreter is stopped with a stopEngine command.

Figure 7:
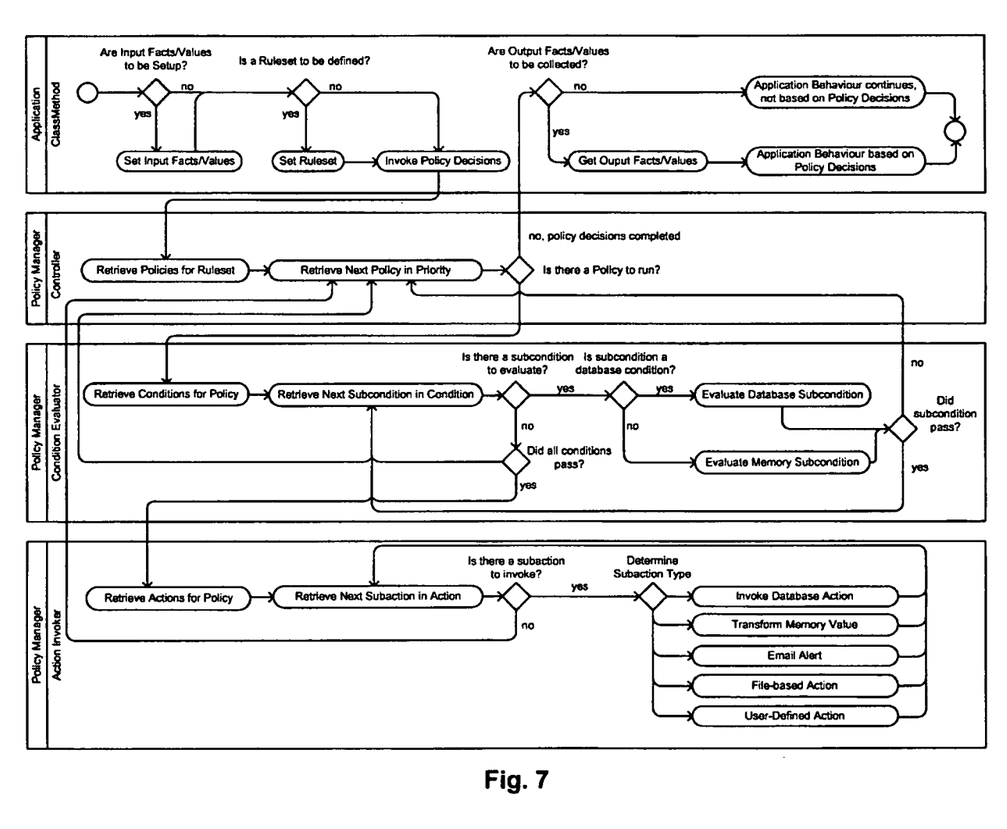
FIG. 7 illustrates a policy interpreter process diagram according to an embodiment of the present invention.

FIG. 7 illustrates a policy interpreter process diagram according to an embodiment of the present invention, and is a more in-depth overview of the process and states for policy Interpretation. There are four "swim lanes", or potential paths. The application engages the policy manager's controller by setting up the facts/values and the ruleset (both if necessary) and then invoking the policy manager for policy decisions. When the policy decisions are returned, they are collected (once again, if necessary) and application behaviour will continue depending on whether policy decisions are important. For instance, when validating a case, the application may setup all the fields and their values as the facts and values, the ruleset will be 'Case Validation', for instance, and then when the policy decisions are returned, the application will look for a warning or an error. Depending on whether or not a warning or error was indicated in the policy decisions, the case may be saved or it may be prevented from being saved.

The policy controller is responsible for gathering all the policies from the requested ruleset, retrieving them one by one based on the order of priority and then calling the condition evaluator.

The condition evaluator is responsible for gathering all of the subconditions and evaluating them one by one. If a subcondition fails (i.e., is false), the conditions evaluator will return to the policy controller to get the next policy. That is, all subconditions in a condition expression must pass in order for the policy to fire. These subconditions can be database conditions (e.g., does a certain value exist for a certain field in a table in the database) or it can be a memory condition (e.g., based on the facts and values provided by the application calling the policy manager, or by memory values transformed by previous policy actions, do these facts and values meet certain criteria, such as equality, existence etc.).

Once all subconditions of a condition have passed, the action invoker is responsible for gathering all of the subactions of the policy and invoking them one by one. These actions can be database actions (e.g., update a field in the database), can transform memory values (e.g., set a fact to be a different value), can alert a user (e.g., send out an email message with information from the facts/values or database), can be a file-based action (e.g., perform file-based operations)

or can be a user-defined action (e.g., move all logs from a logfile into the database, send a SOAP message to another server, ping a server to determine if it is alive etc.).

After all subactions have been completed for a policy's action clause, the action Invoker will return to the policy controller to get the next policy.

Once all policies for a ruleset (or rulesets) have been tested and fired (if conditions passed), the policy controller returns control to the application that invoked it. The application can then get the policy decisions (stored as facts/values) if required by the method that invoked the policy manager in the first place (e.g., case validation, as above, will require examining the policy decisions, however a method that is interested in doing some sort of asynchronous operation (e.g., email, SOAP message), probably doesn't care about the policy decisions.

Policy Manager Rules

Embodiments of the present invention will now be described with respect to policy manager rules. These embodiments are simply exemplary, and in other embodiments certain variations can be made, including whether aspects are required.

As stated earlier, the rules follow an IF . . . FROM . . . THEN format using Functional Logic as the base language for Session Rules and SQL as the base language for Database Rules. SQL was chosen for the Database Rules due to its stability, flexibility, wide acceptance and understanding.

A rule can be divided into three segments and read as follows:

```
IF    Condition
FROM  Source
THEN  Action
```

Each rule is an independent entity, which exists on its own. However, the rule can be linked, or chained, with other rules to create a Rule Chain. Therefore, the Action segment of one rule will provide information to satisfy the Condition segment of a subsequent rule in order to allow that rule to fire.

For Session rules, variables can be used to access values of stored keyword-value pairs. A preprocessor works to first analyze and resolve any variables found in a statement. Property Variables to be analyzed must be stored in a certain format.

A variable has the following format: {<variable>}
e.g.: {City}
{Date of Birth}

Therefore, if a keyword-value pair is stored in memory with the property name of City, then {City} would refer to its value. For example, the variable, City, is set to be Vancouver in memory.

Rule 1: Check for Cities

```
IF    count "cityname <> ' " > 0
FROM  cities
THEN  SetSession (Cities, select cityname from cities)
```

Rule 2: Look for Specific City

```
IF    Find (Cities, {City})
FROM  session
THEN  SetSession (City Found, true)
```

The rules read as follows: The first rule checks to see if there are cities stored in the cities table. If there are cities, then a memory variable, Cities, is set to include all cities found in the table. The second rule checks to see if the city stored in memory, Vancouver, is included in the cities set in the memory variable, Cities. If Vancouver exists, a new memory variable City Found is set to true.

When control is returned to the application that invoked RuleEngine, a check can be made to see if the variable City Found was set to true and then take the required action in the code depending on the outcome. For example, the code may raise a dialog box stating that the city wasn't found and needs to be added to the cities table.

The above two rules show how memory-based, or session, rules can be used in conjunction with rule chaining. Note that these two rules could have been combined into one rule as follows:

Rule 1: Check for Cities

```
IF    cityname = ('{City}('
FROM  cities
THEN  SetSession (City Found, true)
```

In this rule, the City variable would be preprocessed before the IF statement is analyzed. If City was set to be Vancouver, then the IF statement would be resolved to:

IF cityname='Vancouver'

Then the cities table would be checked to see if Vancouver is present.

The Condition segment of a rule indicates the different conditions that must be satisfied in order for a rule to fire. The Condition segment can be composed of multiple conditions.

Each condition is separated from each other by using a semi-colon. Doing so creates a logical AND operator between the conditions whereby all conditions must hold true in order for the rule to fire (Session Condition Operations can be combined with Boolean Logic which is outlined later). Separate database (i.e., SQL) conditions can be combined with separate Session conditions in the Condition segment provided the source for each is specified (see the Source Segment).

Session Conditions in policy manager use a form of functional logic to evaluate an expression. Each Condition expression is composed of a set of functions, or operations, connected in a logical manner. Each of these functions is composed of its function name and arguments.

Within the Condition expression, each function evaluates to either true or false which is used in evaluating the entire expression. These functions have the following general syntax:

Function(argument1, . . . , argumentn)

Various Condition Operations are available in a policy manager according to an embodiment of the present invention.

Boolean logic can be applied to the Session conditions of rules. It cannot be applied to non-Session conditions of rules (e.g., Database Rule Conditions) or, logically, to the Source and Action segments. Boolean logic is a method to evaluate the truth of an expression based on the relationships and organizations within that expression. Only conditions, which pass the entire Boolean expression, evaluate to true. Otherwise, the expression is false.

Boolean Logic is comprised of the AND operator, the OR operator and the NOT operator. Parentheses are also used to organize expressions and force an order of operations during evaluation. Expressions in brackets are evaluated first, AND operations are evaluated second and OR operations are evaluated last.

In a policy manager according to an embodiment of the present invention, parentheses are denoted using square brackets (e.g., [ ]), the AND operator is denoted using the ampersand symbol (e.g., &) and the OR operator is denoted using the pipe symbol (e.g., |). The NOT operator is denoted by the bang, or exclamation, symbol (e.g., !).

The operand of the expression can be any Session rule conditions.

An example of a Boolean Logic Condition is as follows:

```
[Equals(Name, Cam) & Equals(City, Ottawa)] | Equals(Province, ON) |
[!Exists(Country) & [!Exists(Postal Code) & Exists(ZIP Code)]
```

If an entire condition expression evaluates to true, the action will be fired (unless of course, it is part of a series of conditions). If the condition evaluates to false, the action will not be fired, regardless of any other conditions.

The Action segment of a rule indicates what action to take if all conditions within the Condition segment pass. The Action segment can be composed of multiple subactions.

Six types of actions will now be described:

Knowledge Base Modification: the Knowledge Base Modification action invokes an SQL command such as insert, delete or update. For instance, based on some condition occurring, the rule may want to delete data from the database or insert data into the working memory for future use by a rule.

```
e.g.: THEN insert into working_memory (fact, svalue) values
      ('Expired User', 'Cam')
```

Knowledge Base Extraction: the Knowledge Base Extraction action invokes the SQL select command. This action is used in conjunction with other actions. For instance, based on some condition occurring, the rule may want to select information from the database and email it to the user.

Email Notification: the Email Notification action sends an email message to a user. If one isn't named in the action, then the Administrator or Superuser named in the property file is used (policy superuser). It has the following syntax:

```
e.g.: THEN Email ("There is a problem", "select username from
      users", "User_Name@phac-aspc.gc.ca|admin@phac-aspc.gc.ca")
```

Dialog Box Notification: the Dialog Notification action pops up a dialog message box to the user. Note that the Dialog Notification will appear on the machine running the policy Interpreter. It has the following syntax:
e.g.: THEN Dialog ("There is a problem", "select username from users")

File Logging: the File Logging action will log data to a file. Note that the File Logging will log data on the machine running the policy Interpreter. It has the following syntax:
e.g.: THEN File ("output.txt", "select username from users")

Session Modification: for Session rules, data stored in the application as keyword-value pairs can be added or modified, cleared or removed. It has the following syntax:

```
e.g.: THEN SetSession (City, Ottawa)
      THEN SetSession (Country, select country from countries)
      THEN ClearSession (City)   // Clears the City property
      THEN RemoveSession (City)// Removes the City property
```

Numeric-based Actions: for Session variables which have an Integer as their implicit data type, the values can be incremented or decremented. It has the following syntax:

```
e.g.:  THEN Increment(counter)
       THEN Increment(counter, 5)
       THEN Decrement(counter)
       THEN Decrement(counter, 5)
```

Debugging Policies: developers can debug session variables and policies by using the debug statement. The debug output is redirected to standard out (e.g., tomcat window, Catalina.out). Therefore, debug statements should be commented out or removed when in production. It has the following syntax:
e.g.: THEN Debug(The date I received is ={DateReceived})

Date Conversion: dates can be converted from one form into another. This allows for a date to be entered in a different format but stored in another format without the user (e.g., data entry clerk) having to retype the date in a different format. The date to convert must be in an ALPHA-accepted date format. However, the result format can be any valid date format that is specified. It has the following syntax:

```
e.g.:  THEN ConvertDate("DateReceived", "MM/dd/yyyy")
       THEN ConvertDate("DateReceived", "E MMM d, yyyy")
```

User-defined Services: developers can create their own Services to be used in the Action segment of a rule. Services are defined as Java classes to perform complex tasks and can manipulate session variables if required. A framework is in place so that these classes can be added. The inputs and outputs to the service must be published so that other users know what session variables to set and which ones hold any results. It has the following syntax:

```
e.g.: THEN
      // GetC - a Service that gets a token from a delimited
      //   list.
      // [in]: GET_List
      // [in]: GET_Delimiter
      // [in]: GET_Location
      // [out]: GET_Token
      //
      SetSession(MyService, ca.gc.hc_sc.BLCoreP.TestP.GetC);
      InvokeService ({MyService})
```

If there are multiple subactions within an Action segment, each subaction must be delimited by a semi-colon. Note that the defined functions (Email, Dialog and File) use an SQL SELECT statement as their second argument. Note that the SetSession function can also use an SQL SELECT statement as its second argument.

Figure 8:
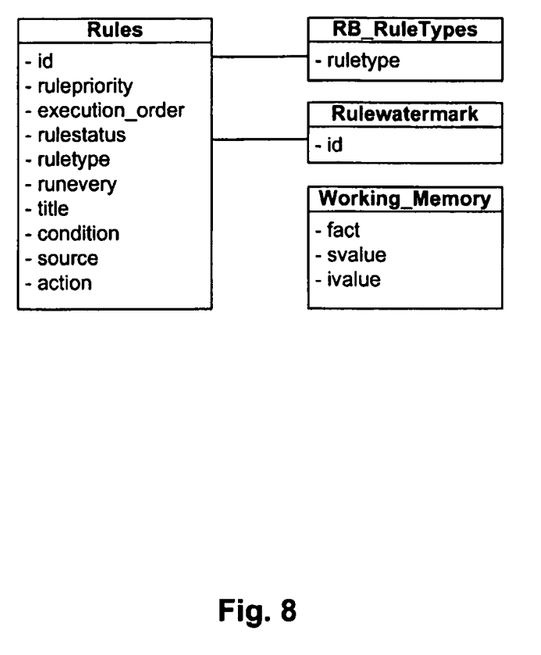
FIG. 8 illustrates a policy manager conceptual schema diagram according to an embodiment of the present invention.

Another thing to note is that the User Defined Service requires access to the RuleBeanC object in order to read and write property information. Therefore, the developer must be careful that data in the original RuleBeanC is not deleted since there is no way to protect the RuleBeanC object from being cleared in a User Defined Service FIG. 8 illustrates a policy manager conceptual schema diagram according to an embodiment of the present invention. The data model for the entity-relationship diagram in FIG. 8 is described below. Each table is outlined along with their field names, types etc.

TABLE 1

Table RULES

| Field Name | Description | Type | Keys | Null |
|---|---|---|---|---|
| ID | Unique identifier of a rule in the system. | NUMBER | PK | No |
| RulePriority | General priority of the rule (1-5). Priority 1 rules are executed first, Priority 2 rules are executed next etc. | VARCHAR2 (20) | | No |
| Execution_Order | Secondary priority of the rule (100-120). Execution Order 100 of a Rule Priority 1 is executed first. An Execution Order of 120 in Rule Priority 5 is executed last. | VARCHAR2 (20) | | No |
| RuleStatus | Active or Inactive. Only Active rules are tested. | VARCHAR2 (20) | | No |
| RuleType | Rule classification for organization and understanding purposes. | VARCHAR2 (40) | | No |
| RunEvery | Determines frequency of rule execution. | VARCHAR2 (15) | | No |
| Title | Description of rule. | VARCHAR2 (80) | | No |
| Condition | Condition rule must satisfy. | VARCHAR2 (3000) | | No |
| Source | Tables which contain the data on which conditions will be analyzed. | VARCHAR2 (2000) | | No |
| Action | Action to take if condition passes. | VARCHAR2 (3000) | | No |

TABLE 2

Table RULEWATERMARK

| Field Name | Description | Type | Keys | Null |
|---|---|---|---|---|
| ID | Unique identifier of the next rule to be created in the system. | NUMBER | PK | No |

TABLE 3

Table WORKING_MEMORY

| Field Name | Description | Type | Keys | Null |
|---|---|---|---|---|
| Fact | Identifier of a fact in the knowledge base. | VARCHAR2 (100) | | No |
| Svalue | String value of the fact. | VARCHAR2 (100) | | Yes |
| Ivalue | Integer value of the fact. | NUMBER | | Yes |

TABLE 4

Table RB_RULETYPES

| Field Name | Description | Type | Keys | Null |
|---|---|---|---|---|
| RuleType | Rule classification for organization and understanding purposes. | VARCHAR2 (40) | PK | No |

The following are potential applications for a policy manager according to an embodiment of the present invention. This list is far from exhaustive.

Policy Notification: application users usually have certain policies they would like enforced. For instance, an administrator of an application may want to know if a user hasn't logged in for a certain period of time (e.g., 2 months). Another administrator may want to disable a user if their password has expired (e.g., set over 3 months ago). Other administrators may want to be notified if more than 100 cases of a particular disease have been entered in a certain province.

Knowledge Extraction: as stated earlier, data can reside within many different tables within a database. If the application itself hasn't been programmed to look for certain patterns or correlated data, information can reside undetected. Using rule chaining and data deduction, information can be extracted from the database on-the-fly. What this means is that rules can be created, modified or deleted dynamically to look for interesting information without a software recompilation. Rules can be linked, or chained, in order to work together towards some final outcome. Due to the hard-coded nature of applications (and thus, a significant turn-around time for software updates/patches), a lot of information about a system is collected in hindsight. Real-time data monitoring aimed at looking for certain behaviour can be a proactive step to help find problems before they occur.

Data Prediction: as information is gathered from the database, future information about the system may be predicted. For instance, keeping a running tally of the average age of a patient may help to better predict the age of incoming patients, if this is an important fact to know.

Data Integrity Verification: applications store many different types of data in different places. Data integrity issues can arise if this data is out of sync or mismatched. For instance, survey applications collect questionnaire responses from participants. If a participant responds 'Yes' to one question, it may be invalid if the participant responds 'No' to another question. Setting up data-monitoring rules to watch for these discrepancies is important.

Diagnosis and Repair: rules can be setup to find and repair problems before these problems become an issue. Any corrective work performed can then be provided to the user.

Application Integration: the policy Interpreter can be built into Java-based applications in order to execute specific rule sets (types) based on an application's business logic.

In the above description, for purposes of explanation, numerous details have been set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A method of software policy management, comprising:
defining a set of generic policies applicable to both a first policy-enabled software application and a second policy-enabled software application, the first and second policy-enabled software applications having different policies;
creating, independent of the defined policies and during development of the first policy-enabled software application, a first policy enforcement point in uncompelled software code for the first policy-enabled software application, the first policy enforcement point enabling policy management by providing a first information element as an output from a compiled version of the first policy-enabled software application;
creating, independent of the defined policies and during development of the second policy-enabled software application, a second policy enforcement point in uncompelled software code for a second policy-enabled software application, the second policy enforcement point enabling policy management by providing a second information element as an output from a compiled version of the second policy-enabled software application, the compiled version of the second policy-enabled software application having a different policy requirement than the first policy-enabled software application;
creating, based on the defined set of generic policies, first and second policy decision points as database fields in a policy manager external to the first and second policy-enabled software applications;
receiving, at run-time, the first and second information elements at the first and second policy decision points; and
performing policy decision making by configuring policy management at run-time for the first and second software applications having different policy requirements based on the set of generic policies and in response to the received first and second information elements.

2. The method of claim 1 wherein the step of performing policy decision making for the first and second software applications having different policy requirements comprises different decision making for the first and second software applications.

3. The method of claim 1 wherein the first and second software applications have different policy types.

4. The method of claim 1 further comprising receiving a policy decision at the first policy enforcement point and determining an action to be taken in the first policy-enabled software application in response to the received policy decision.

5. The method of claim 1 further comprising generating and propagating a corporate policy decision by returning the corporate policy decision to the first and second compiled policy-enabled software applications.

6. The method of claim 1 wherein the compiled version of the first policy-enabled software application is deployed in a plurality of instances, and the method further comprises generating and propagating an individual application policy decision by returning the individual application policy decision to each of the plurality of instances of the first policy-enabled software application.

7. The method of claim 1 wherein the steps of creating the first and second policy enforcement points are performed before the step of defining the policies.

8. The method of claim 7 wherein the policies are defined in relation to the data in the first information element and/or the second information element.

9. The method of claim 1 wherein the first and second policy enforcement points are inserted at points at which potential dynamic behavior is required.

10. The method of claim 1 wherein the first and second policy enforcement points provide data useful for an undetermined policy decision.

11. The method of claim 1 wherein the first and second policy enforcement points provide data to be used in relation to a policy decision for an unforeseen user requirement.

12. The method of claim 1 wherein the first and second policy enforcement points provide data to be used in relation to a policy decision for a user requirement additional to current user requirements.

13. A non-transitory computer-readable storage device storing statements and instructions for execution by a processor to perform a method of software policy management comprising:
defining a set of generic policies applicable to both a first policy-enabled software application and a second policy-enabled software application, the first and second policy-enabled software applications having different policies;
creating, independent of the defined policies and during development of the first policy-enabled software application, a first policy enforcement point in uncompelled software code for the first policy-enabled software application, the first policy enforcement point enabling policy management by providing a first information element as an output from a compiled version of the first policy-enabled software application;

creating, independent of the defined policies and during development of the second policy-enabled software application, a second policy enforcement point in uncompelled software code for a second policy-enabled software application, the second policy enforcement point enabling policy management by providing a second information element as an output from a compiled version of the second policy-enabled software application, the compiled version of the second policy-enabled software application having a different policy requirement than the first policy-enabled software application;

creating, based on the defined set of generic policies, first and second policy decision points as database fields in a policy manager external to the first and second policy-enabled software applications;

receiving, at run-time, the first and second information elements at the first and second policy decision points; and performing policy decision making by configuring policy management at run-time for the first and second software applications having different policy requirements based on the set of generic policies and in response to the received first and second information elements.

14. The non-transitory computer-readable storage device of claim 13 wherein the steps of creating the first and second policy enforcement points are performed before the step of defining the policies.

15. The non-transitory computer-readable storage device of claim 13 wherein the first and second policy enforcement points are inserted at points at which potential dynamic behavior is required.

16. The non-transitory computer-readable storage device of claim 13 wherein the first and second policy enforcement points provide data useful for an undetermined policy decision.

17. The non-transitory computer-readable storage device of claim 13 wherein the first and second policy enforcement points provide data to be used in relation to a policy decision for an unforeseen user requirement.

18. The non-transitory computer-readable storage device of claim 13 wherein the first and second policy enforcement points provide data to be used in relation to a policy decision for a user requirement additional to current user requirements.

* * * * *